| United States Patent [19] | [11] | 4,448,789 |
|---|---|---|
| Yang | [45] | May 15, 1984 |

[54] ENHANCED FLAVOR-RELEASING AGENT

[75] Inventor: Robert K. Yang, Morris Plains, N.J.

[73] Assignee: Warner-Lambert Company, Morris Plains, N.J.

[21] Appl. No.: 412,323

[22] Filed: Aug. 27, 1982

[51] Int. Cl.³ .................. A23G 3/30; A23L 1/222; A23L 1/226

[52] U.S. Cl. .................................. 426/5; 426/3; 426/103; 426/96; 426/650; 426/651; 426/533; 426/534

[58] Field of Search ........................ 426/3–6, 426/103, 650, 651, 533, 534, 96

[56] References Cited

U.S. PATENT DOCUMENTS

| 2,369,847 | 2/1945 | Olsen et al. | 426/651 |
|---|---|---|---|
| 2,904,440 | 9/1959 | Dimick | 426/650 |
| 3,615,597 | 10/1971 | Durst et al. | 426/650 |
| 3,826,847 | 7/1974 | Ogawa et al. | 426/3 |
| 3,971,852 | 7/1976 | Brenner et al. | 426/650 |
| 4,271,202 | 6/1981 | Giel | 426/650 |
| 4,388,328 | 6/1983 | Glass | 426/651 |

*Primary Examiner*—Jeanette M. Hunter
*Attorney, Agent, or Firm*—Gary M. Nath; Daniel A. Scola

[57] ABSTRACT

A flavoring composition and method for making and using the same comprising a flavoring agent and a hydrophilic polymer, said hydrophilic polymer being characterized by
(a) being water-soluble,
(b) being soluble in organic solvent,
(c) having a viscosity below 100 cps, 10% by weight, at 25° C. in water, and
(d) being compatible with the flavoring agent.

20 Claims, No Drawings

ENHANCED FLAVOR-RELEASING AGENT

The present invention relates to a flavoring composition and more particularly to flavoring compositions having a high initial flavor release in chewing gum compositions.

Chewing gums generally contain a water-insoluble gum base, a water insoluble flavor oil and water soluble sweeteners such as sucrose and corn syrup or in sugarless gum, sorbitol, mannitol and artifical sweeteners. Also incorporated within the gum base may be plasticizers or softeners to improve consistency and texture of the gum.

A deficiency of conventional gums has been the underutilization of the flavor oils present in the gum base, such that during the first 3 to 5 minutes of chewing only about 10% or less of the flavor oil is removed. The remaining flavor oil stays trapped in the chewed gum and is not perceived by the chewer.

Various attempts have been made to overcome this deficiency such as by preparing chewing gums having a prolonged flavor release. U.S. Pat. No. 3,826,847 to Ogawa et al disclose a method for making a durable flavor gum by coating, encapsulating or combining high molecular weight compounds such as polyvinyl esters with flavored seasonings. Once prepared, the coated seasonings are incorporated into a chewing gum. As useful coating agents, the reference discloses starches, cellulose, proteins and polyvinyl alcohols, useful water-soluble compounds and polyvinyl acetate as a useful water-insoluble compound. Similar to the Ogawa et al disclosure, U.S. Pat. No. 3,903,305 to Bahoshy discloses the formation of chewing gums having longer lasting sweeteners and flavor by fixing monosodium glutamate, saccharin and/or cyclamate in a gelatin coating. The gelatin fixation is disclosed as providing a delayed release of flavor over an extended time.

While the prior art processes, such as those described above, have attempted to delay and prolong the flavor release, such processes have not been effective in increasing the amount of flavor released during the initial chewing. It would therefore be beneficial to provide a flavoring composition which enhances release of the flavoring agent not only at initial chewing but for prolonged periods to improve the overall flavor perception of the user. The present invention describes such a flavoring composition.

It has been unexpectedly discovered that the flavor release from a chewing gum is significantly enhanced when the flavoring agent is combined with a hydrophilic polymer having specific properties. When combined in this manner, it has been found that the enhanced flavor release manifested by the flavoring compositions of this invention are evident almost immediately upon tasting the sample.

In particular, a flavoring composition has been unexpectedly discovered which comprises a flavoring agent and a hydrophilic polymer, said hydrophilic polymer being characterized by
(a) being water-soluble,
(b) being soluble in organic solvent,
(c) having a viscosity below 100 cps, 10% by weight at 25° C. in water, and
(d) being compatible with the flavoring agent.

In another aspect of the invention a flavored chewing gum having a high degree of flavor release has been unexpectedly discovered which comprises a chewing gum base, and a flavoring composition, said flavoring composition comprising a flavoring agent and a hydrophilic polymer, said hydrophilic polymer being characterized by
(a) being water-soluble,
(b) being soluble in organic solvent,
(c) having a viscosity below 100 cps, 10% by weight at 25° C. in water, and
(d) being compatible with the flavoring agent.

The gum base used in this invention may be any water-insoluble gum base well known in the art. Illustrative examples of suitable polymers in gum bases include without limitation substances of vegetable origin such as chicle, jelutong, guttakay and crown gum; synthetic elastimers such as butadiene-styrene copolymer, isobutylene isoprene copolymer, polyethylene, polyisobutylene and polyvinylacetate and the like.

The amount of gum base employed will vary greatly depending on various factors such as the type of base used, consistency desired and other components used to make the final product. In general, amounts from about 5% to 35% by weight of the final gum base composition are acceptable with preferred amounts of about 15% to about 25% by weight being used.

Plasticizers or softeners such as lanolin, stearic acid, sodium stearate, potassium stearate, glyceryl triacetate, glycerin and the like may also be incorporated into the gum base to obtain desirable texture and consistency properties. Such materials are generally employed in amounts up to 30% by weight and preferably from 3 to 7% by weight of the final gum base composition.

The gum composition generally contains a sweetening agent. Sweetening agents may be selected from a wide range of materials such as water-soluble sweetening agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e. sodium or calcium saccharin salts, cyclamate salts and the like, and the free acid form of saccharin.

C. Dipeptide based sweeteners include L-aspartyl-L-phenylalanine methyl ester and materials described in U.S. Pat. No. 3,492,131 and the like.

In general, the amount of sweetener will vary with the desired amount of sweetener selected for a particular chewing gum. This amount will normally be about 0.01% to about 90% by weight when using an easily extractable sweetener. The water-soluble sweeteners described in category A are preferably used in amounts of about 25% to about 75% by weight, and most preferably about 50% to about 65% by weight of the final chewing gum composition. In contrast, the artifical sweeteners described in categories B and C are used in amounts of about 0.01% to about 5.0% and most preferably about 0.05% to about 0.25% by weight of the final chewing gum composition. These amounts are necessary to achieve a desired level of sweetness independent from the flavor level achieved from the flavor oil.

The chewing gum of this invention may likewise contain additional conventional additives, including fillers such as calcium carbonate and talc; emulsifiers such as glyceryl monostearate and lecithin; coloring agents such as titanium dioxide and other conventional chewing gum additives known to one skilled in the chewing gum art.

Conventional chewing gum flavors are in general, hydrophobic liquids. These materials are extracted slowly during chewing since the flavoring agent is very soluble in the gum base and only poorly soluble in saliva. It appears that during the first few minutes of chewing, that the majority of removable flavor is removed with the sweetener thus leaving an essentially tasteless residue of gum bolus when the flavoring agents are added by conventional means. This appears evident even though the major amount of flavoring agent remains incorporated in the gum bolus, This effect is believed to result from the preferential adsorption of the flavoring agent within the gum base composition.

It has been unexpectedly discovered that if a conventional chewing gum flavor is combined with a hydrophilic polymer having specific properties that the flavor-polymer combination when incorporated into an otherwise conventional chewing gum enables the rapid initial release of high amounts of flavoring agent and provides a prolonged period of flavor perception by the user.

The flavoring agents useful to prepare the flavoring compositions of this invention may be derived from synthetic flavor oils and/or oils derived from plants, leaves, flowers, fruits, and so forth, and combinations thereof. Representative flavor oils include peppermint oil, spearmint oil, cinnamon oil, and oil of wintergreen (methylsalicylate). Also useful are natural or synthetic fruit flavors such as citrus oils including lemon, orange, grape, lime, and grapefruit, and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight of the final chewing gum composition are useable with amounts of about 0.3% to about 1.5% being preferred and about 0.8% to about 1.2% being most preferred.

Any non-toxic hydrophilic polymer may be utilized in this invention provided the polymer has the following characteristics:
 (a) water-soluble,
 (b) organic solvent soluble,
 (c) low viscosity of less than 100 centipoise (cps), at 25° C. in water in a 10% by weight solution, and
 (d) compatibility with the flavor agent.

The hydrophilic polymer is used in amounts of at least 3 parts by weight of polymer to 1 part by weight flavoring agent. Any amount above 3 parts by weight polymer may be used provided the polymer does not interfere with the flavor release. Preferred amounts of polymer may range from about 0.15% to about 40% by weight and most preferably from about 1.5% to about 18% by weight of the final chewing gum composition.

Water solubility is essential to enable a rapid dissolution in saliva and concomitant high initial flavor release. Organic solvent solubility is essential to enable preferential retention of the flavor agent with the hydrophilic polymer in competition with the gum base. Low viscosity is needed to enable easy incorporation in the chewing gum base while achieving storage stability by inhibiting flavor agent release through equilibration. A particularly preferred hydrophilic polymer finding wide utility in this invention is polyvinylpyrrolidone. The quantities of the hydrophilic polymers may be used alone with the flavoring agent or in combination with unsuitable hydrophilic polymers. For example, polyvinylpyrrolidone may be used alone or in combination with similar yet unsuitable polymers such as hydroxypropyl cellulose, and ethylcellulose. Such supplemental or unsuitable polymers may be used in varying amounts. Suitable amounts of up to 50% or more by weight of acceptable hydrophilic polymer may be employed with amounts of 1 to 20% by weight of acceptable hydrophilic polymer being preferred.

The novel flavoring agent-hydrophilic polymer combination of this invention may be prepared by several means. One method involves dry mixing the two ingredients at a temperature from about 120° to 200° C. Mixing is continued until a homogenous mixture is prepared, which takes approximately 5 to 60 minutes. Once mixing is complete, the mass is cooled to prepare a hard brittle product which can either be stored for further processing or ground to a size suitable for use in a chewing gum composition. Cooling can be easily achieved by lowering the temperature of the formulation below 0° C. and preferably below 20° C. Once cooled, the flavoring composition may be stored or processed further, such as by grinding.

When ground, grinding is done to prepare a particulate average size particle which will achieve rapid extraction from a gum base. It has been found that the average particle size of about 200 to about 850 microns is preferred to achieve maximum flavor release. Particles above 850 microns are not desired since such large particle result in a chewing gum having a grainy texture, whereas particles below about 200 microns create a stability problem resulting from flavor migration into the gum base. A more preferred average particle size range are particle sizes of 250 to 800 microns. When the fused product is prepared by dry mixing under heat, the product should have a preferred weight ratio of at least 3 parts of hydrophilic polymer to 1 part flavoring agent. Lower ratios, that is ratios of less than 3 to 1 of hydrophilic polymer to flavoring agent result in the formation of an unacceptable product having a paste consistency, which material is difficult to process at room temperatures.

An alternate process for preparing the hydrophilic polymer-flavor agent combination which avoids the aforementioned process difficulties involves the use of an organic solvent to dissolve the polymer and flavoring agent. The organic solvent may be selected from any low boiling solvent that can be easily removed from the reactants by conventional means. Illustrative solvents include methylene chloride, ethyl alcohol, and methyl alcohol. A sweetening agent, such as those described above may be optionally slurred into the resulting solution which will result in the formation of a coated particle having both sweetening and flavoring properties. The reactants should be agitated to prepare a homogenous mixture. Upon completion of mixing the solvent may be removed by standard means, such as vacuum drying and the product recovered. Other routine processing methods may also be employed to dry the resulting product, such as spray-drying, drum-drying, slab-drying, oven drying, tray-drying, pan drying or other well known drying technique. The resulting novel flavoring agent may be ground such as by milling to the desired particle size described above for subsequent incorporation into a chewing gum formulation.

Once the novel flavoring agent hydrophilic polymer combination is prepared, it may be incorporated into an otherwise conventional chewing gum formulation using standard techniques and equipment known to those skilled in the art. In a typical embodiment the chewing gum base is blended with a plasticizer together with other additives such as fillers and coloring agents under heat to plasticize the blend as well as to modulate the hardness, viscoelasticity and formability of the base. The heating temperature may vary widely but is for practical purposes preferably around 70° C. to 120° C. The chewing gum base is then blended with the flavoring composition which may have been previously blended with other ingredients. Once blending is achieved the chewing gum formulation is removed and formed into any suitable shape. To avoid decomposition of the flavoring agent hydrophilic polymer during blending in the chewing gum formulation, free water content in the chewing gum should be maintained below 8% and preferably below 3% by weight of the chewing gum composition.

The chewing gums of the invention may be in any form known in the art, such as stick gum, slab gum, chunk gum, shredded gum, hard coated gum, as well as center-filled gum.

The following examples are given to illustrate the invention, but are not deemed to be limiting thereof. All percentages given throughout the specification are based upon weight unless otherwise indicated.

EXAMPLE 1

This Example demonstrates a method for preparing the hydrophilic polymer-flavor product of this invention.

To a sealed container is added 30 grams of powdered polyvinylpyrrolidone (PVP). Flavor oil (5 grams) is slowly added to the PVP and blended by mechanical stirring. The mixture is heated to around 150° C. and maintained at this temperature until a homogenous product is obtained, approximately 5 minutes. The product is cooled to approximately −70° C. to prepare a brittle material suitable for grinding. The product is then removed and ground to a fine particle size of less than 840 microns. A stable PVP-flavor oil product is recovered which is useable as a flavor releasing agent. The particular flavor oils used and results achieved are set forth in Table I.

EXAMPLE 2

This Example demonstrates a method for preparing the hydrophilic polymer-flavor product of this invention in the presence of sweetening agents.

To a container having a sigma shaped blade mixer is added 600 grams of crystalline sorbitol as the sweetening agent. To the container is then added a previously prepared solution containing 24 grams peppermint flavor oil and 72 grams polyvinylpyrrolidone both dissolved in 300 milliliters methylene chloride at 35° C. This mixture is added slowly to the sorbitol with mixing and mixing continued for approximately 5 minutes to prepare a homogenous mixture. Vacuum is applied to remove the methylene chloride solvent. The resulting solid product is ground to a free flowing powder consistency having an average size of less than 840 microns. The particular flavor oils and results are set forth in Table II.

EXAMPLE 3

This Example demonstrates the use of the inventive hydrophilic polymer-flavor oils from Example 1 in a chewing gum composition.

A fast flavor-releasing chewing gum is prepared with the following ingredients:

| Ingredient | % by Weight |
| --- | --- |
| Gum base | 26.4 |
| Glycerin, USP | 5.0 |
| Water, distilled | 2.7 |
| Sorbitol | 57.2 |
| PVP - peppermint flavor | 8.8 (respectively 7.6% and 1.2%) |
| Saccharin, acid | .1 |

The PVP-flavor product along with saccharin is added to the sorbitol powder in a mixer kettle equipped with sigma blades and mixed for 3 minutes at 50° C. The gum base is melted from 90° C. to 100° C. and mixed into the kettle along with the glycerin and water. Mixing is continued for five minutes. The gum is then discharged from the kettle and formed into stripes having a thickness of 0.18 centimeter and cooled to room temperature.

In order to evaluate the chewing gum formulation of this Example a comparison was undertaken with a control gum formulation prepared without the presence of the PVP-flavor oil.

The compositions were subjected to flavor chew out studies using a group of five subjects who chewed samples of the gums for 10 and 20 minute intervals. The amount of flavor oil remaining in the bolus after the respective chew times was determined by gas chromatography. The results set forth in Table III demonstrate the high level of flavor extraction achieved with the inventive compositions.

EXAMPLE 4

This Example demonstrates the preparation of various compositions containing polyvinylpyrrolidone-flavor oils and additional hydrophilic polymers.

The compositions were prepared by the procedure set forth in Example 2 except that the additional hydrophilic polymers were dissolved along with the PVP simultaneously in the methylene chloride solvent.

The particular compositions are set forth in Table IV.

EXAMPLE 5

This Example demonstrates the preparation of a chewing gum composition containing the flavor releasing products of Example 4.

A fast flavor-releasing chewing gum is prepared with the ingredients set forth in Table V. In order to evaluate the compositions prepared, the compositions were subjected to flavor chew out studies using a group of seven subjects who chewed samples of the gum for 5 minutes. The amount of flavor oil remaining after the chew time was determined by gas chromatography. The results demonstrate a higher percentage of flavor release for the inventive compositions. Results are set forth in Table VI.

EXAMPLE 6

This Example demonstrates the preparation of a chewing gum composition containing various flavor releasing compositions prepared from different polymeric materials.

The chewing gum composition of Example 3 was used with several of the flavor-polymer combinations. All particular combinations potentially useable are recited in Table VII. The only acceptable combination was derived from polyvinylpyrrolidone as the hydrophilic polymer. The remaining polymers produced unacceptable flavor-polymer combinations and/or chewing gum formulations.

The flavor-polymer combinations recited in comparative test V (methyl cellulose); Y (hydroxyethyl cellulose); and Z (carboxymethyl hydroxyethyl cellulose) were unacceptable because of high viscosity for Run "V" and non-organic solubility for Runs Y and Z. The remaining comparative runs were unacceptable in a chewing gum formulation since they all resulted in low flavor perception.

The invention being thus described, it will be obvious that the same may be varied in many ways. Such variations are not to be regarded as a departure from the spirit and scope of the invention and all such modifications are intended to be included within the scope of the following claims.

TABLE I

| Run Number | Flavor Oil | Resulting Color |
|---|---|---|
| A | Peppermint | white to pale yellow |
| B | Spearmint | white to pale yellow |
| C | Cinnamon | light brown |
| D | Bubble | orange brown |
| E | Fruit | red brown |

TABLE II

| Run Number | Flavor Oil | Resulting Color |
|---|---|---|
| F | Peppermint | white |
| G | Cinnamon | white |
| H | Fruit | white |

TABLE III

| Base Composition | Flavor Extracted | |
|---|---|---|
|  | 10 Minutes | 20 Minutes |
| I Control gum | 6.7% | 9.5% |
| J Inventive gum | 13.7% | 18.8% |

TABLE IV

| Run Number | Peppermint Flavor Oil (g) | PVP (g) | Additional Polymer (g) | Sorbitol (g) |
|---|---|---|---|---|
| K | 24 | 72 |  | 600 |
| L | 24 | 140 |  | 600 |
| M | 24 | 150 |  | 500 |
| N | 24 | 140 | 10 g hydroxpropyl cellulose | 600 |
| O | 24 | 140 | 20 g ethylcellulose | 600 |

TABLE V

| Ingredient | Run Number (% by Weight) | | | |
|---|---|---|---|---|
|  | P | Q | R | S |
| Gum Base | 26.4 | 26.4 | 26.4 | 26.4 |
| Glycerin, USP | 4.0 | 4.0 | 4.0 | 4.0 |
| Water, distilled | 2.1 | 2.1 | 2.1 | 2.1 |
| Sorbitol | 66.9 | 50.6 | 48.1 | 47.9 |
| Peppermint Oil | 0.6 | — | — | — |
| Run M composition | — | 16.9 | — | — |
| Run N composition | — | — | 19.4 | — |
| Run O composition | — | — | — | 19.6 |

TABLE VI

| Run Number | Flavor Extraction % after 5 minutes |
|---|---|
| Control Run P | 7.8 |
| Inventive Run Q | 28.6 |
| Inventive Run R | 27.2 |
| Inventive Run S | 27.2 |

TABLE VII

| | Substance | Water Solubility | Organic Solvent Solubility | Viscosity (cps) 10% in water at 25° C. | Trade Name Grade & Maker |
|---|---|---|---|---|---|
| Inventive | | | | | |
| T | Polyvinylpyrrolidone | Yes | Yes | 5 | Plasdone K-30 GAF |
| Comparative | | | | | |
| U | Hydroxypropyl Cellulose | Yes | Yes | 300 | Klucel EF Hercules |
| V | Methylcellulose | Yes | Yes | 5000 | Methocel A15 Dow |
| W | Hydroxylpropyl Methylcellulose | Yes | Yes | 300 | Methocel E5 Dow |
| X | Ethylcellulose | sparingly | Yes | 40* | Ethoxyl N-7 Hercules |
| Y | Hydroxyethyl cellulose | Yes | No | NM | Natrocol Hercules |
| Z | Carboxymethyl Hydroxyethyl cellulose | Yes | No | NM | CMHEC Hercules |
| ZZ | Polydextrose | Yes | No | NM | Pfizer |
| ZZZ | Gelatin | Yes | No | NM | Corn Product Co. |

NM: Not Measured
*Solvent is 4:1/toluene - ethanol at 25° C.

What is claimed is:
1. A flavoring composition, which comprises: a flavoring agent and a hydrophilic polymer, said hydrophilic polymer being characterized by

(a) being water-soluble,
(b) being soluble in organic solvent,
(c) having a viscosity below 100 cps, 10% by weight, at 25° C. in water, and
(d) being compatible with the flavoring agent.

2. The flavoring composition of claim 1 wherein the flavoring composition is a solid having an average particle size between 200 and 850 microns.

3. The flavoring composition of claim 1 wherein the hydrophilic polymer is polyvinylpyrrolidone.

4. The flavoring composition of claim 1 wherein the flavoring agent comprises natural or synthetic oils.

5. The flavoring composition of claim 1 wherein the flavoring composition is coated on a sweetening agent.

6. The flavoring composition of claim 1 wherein the flavoring composition is coated on a sweetening agent selected from the group consisting of water-soluble sweetening agents, water-soluble artificial sweeteners, dipeptide based sweeteners and mixtures thereof.

7. The flavoring composition of claim 6 wherein the water-soluble sweetening agent comprises sorbitol, xylitol or mannitol.

8. The flavoring composition of claim 1 which contains additional hydrophilic polymers.

9. A flavored chewing gum having a high degree of flavor release, which comprises: a chewing gum base, and a flavoring composition, said flavoring composition comprising a flavoring agent and a hydrophilic polymer, said hydrophilic polymer being characterized by
(a) being water-soluble,
(b) being soluble in organic solvent,
(c) having a viscosity below 100 cps, 10% by weight at 25° C. in water, and
(d) being compatible with the flavoring agent.

10. The flavored chewing gum of claim 9 wherein said flavoring composition is present in the amount of about 0.05 to about 3.0% by weight of the chewing gum.

11. The flavored chewing gum of claim 9 wherein the flavoring composition is in the form of finely ground particles having an average particle size between 200 and 850 microns.

12. The flavored chewing gum of claim 9 wherein the hydrophilic polymer is polyvinylpyrrolidone.

13. The flavored chewing gum of claim 9 wherein the flavoring agent comprises natural or synthetic oils.

14. The flavored chewing gum of claim 13 wherein the flavoring agent is selected from the group consisting of peppermint oil, spearmint oil, cinnamon oil, oil of wintergreen, bubble flavor, fruit flavors and mixtures thereof.

15. The flavored chewing gum of claim 9 wherein the flavoring composition is coated on a sweetening agent.

16. A process for preparing a flavoring composition, which comprises: admixing at least 3 parts by weight of a hydrophilic polymer and 1 part by weight of a flavoring agent in a low boiling solvent, admixing the ingredients for a sufficient time to obtain a homogenous mixture, removing the solvent by evaporation, and recovering the resulting solid flavoring composition product, said hydrophilic polymer being characterized by
(a) being water-soluble,
(b) being soluble in organic solvent,
(c) having a viscosity below 100 cps, 10% by weight, at 25° C. in water, and
(d) being compatible with the flavoring agent.

17. The process of claim 16 wherein a sweetening agent is added to the solvent and admixed with the hydrophilic polymer and flavoring agent.

18. A process for preparing a flavoring composition, which comprises: admixing at least 3 parts by weight of a hydrophilic polymer and 1 part by weight of a flavoring agent, heating the mixture to a temperature from 120° to 200° C. to prepare a homogenous mixture, cooling the homogenous mixture to form a hard flavoring composition product and recovering the product.

19. The process of claim 17 wherein the recovered product is ground to a fine powder having an average particle size between 200 to 850 microns.

20. A process for preparing a flavored chewing gum, which comprises admixing a chewing gum base at a temperature from about 70° C. to 120° C. with a flavoring composition, continuing the mixing until a uniform mixture of gum base and flavoring composition is obtained and thereafter forming the mixture into suitable chewing gum shapes, said flavoring composition comprising a flavoring agent and a hydrophilic polymer, said hydrophilic polymer being characterized by
(a) being water-soluble,
(b) being soluble in organic solvent,
(c) having a viscosity below 100 cps, 10% by weight, at 25° C. in water, and
(d) being compatible with the flavoring agent.

* * * * *